Feb. 25, 1930.  T. P. SHAW ET AL  1,748,657
MAIL BOX
Filed June 20, 1928  2 Sheets-Sheet 1
FIG-1-
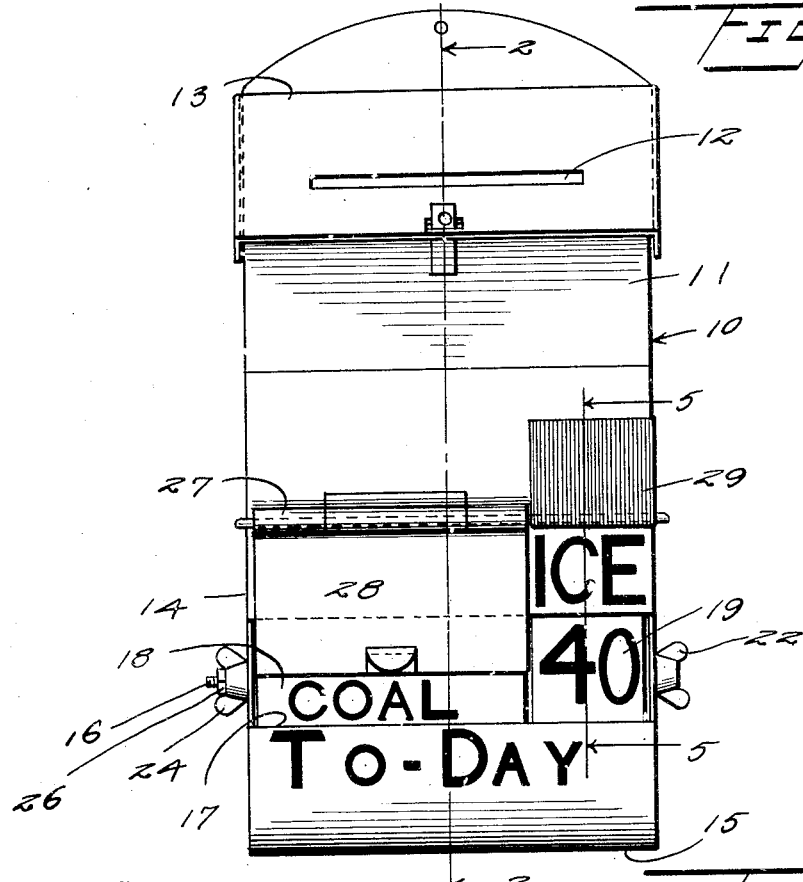
FIG-3-
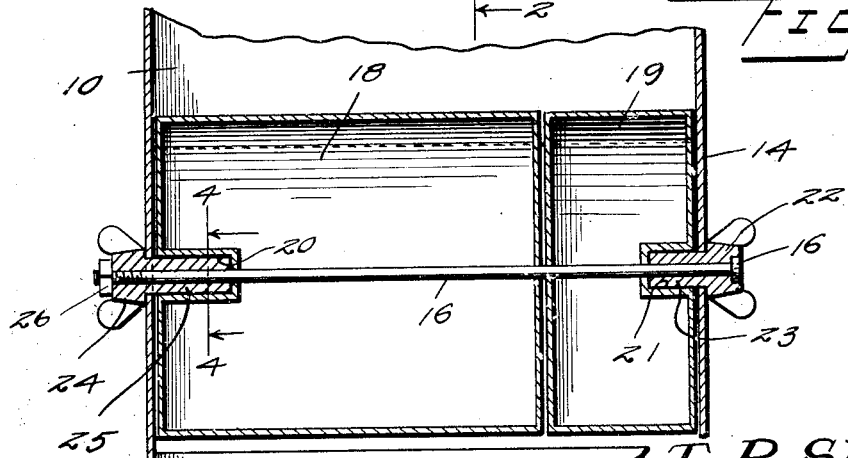
Inventors
T. P. Shaw
G. W. Rakestraw
By
Attorney Patented Feb. 25, 1930

1,748,657

UNITED STATES PATENT OFFICE

THOMAS P. SHAW AND GEORGE W. RAKESTRAW, OF BLACKWELLS, GEORGIA

MAIL BOX

Application filed June 20, 1928. Serial No. 286,801.

This invention relates to new and useful improvements in mail boxes, and particularly to mail boxes which are adapted to advertise the fact that the owner desires various supplies.

One object of the present invention is to provide a device of this character which is equipped with indicating devices, shiftable into positions which will call the attention of different vendors to the fact that the owner of the device is in need of certain commodities, and the amounts of quantities thereof.

Another object resides in the particular construction of the mounting of the rotatable indicators, whereby a single shaft supports two drums, and such drums are capable of independent rotation.

Other objects and advantages will be apparent from the following description when taken in connection with the accompanying drawings.

In the drawings:

Figure 1 is a front elevation of a mail box made in accordance with the present invention.

Figure 2 is a vertical central sectional view on the line 2—2 of Figure 1.

Figure 3 is a vertical transverse sectional view through the lower portion of the device, longitudinally of the drums.

Figure 4 is an enlarged vertical sectional detail on the line 4—4 of Figure 3.

Figure 5 is a vertical detail sectional view on the line 5—5 of Figure 1.

Figure 6 is a detail view of the larger drum.

Referring particularly to the accompanying drawings, 10 represents, as a whole, the box or housing of the device. The upper portion 11, of the housing is in the form of a receptacle, having a mail slot 12, in its upper wall, such wall being hinged at 13, whereby to permit raising of the same, to permit removal of the mail. The lower portion of the casing, or housing, as indicated at 14, is of greater thickness than the upper portion, and has the lower end rounded, as shown at 15. Disposed within this lower portion of the housing, and extending transversely thereof, is a shaft 16, one end of which is provided with a head 16, while the opposite end is threaded. The front wall of the lower portion of the housing is formed with a transversely extending slot or sight opening 17, and disposed on the said shaft, behind said opening, are two drums 18 and 19. In the center of the outer end wall of the drum 18 there is formed an inwardly extending recess 20, angular in cross section, while in the center of the outer end wall of the drum 19 there is formed a similar recess 21. The shaft 16 extends through openings formed in the inner ends of said drums, and openings in the bottom walls of the said recesses, the ends of the shaft projecting beyond the opposite sides of the housing. Disposed on the headed end of the shaft, externally of the side of the housing, is a winged member 22, said member having a stem 23, angular in cross section, which is fitted snugly in the recess 21, said stem and member receiving the adjacent end of the shaft rotatably therethrough, the head of the shaft lying loosely against the outer end of the member 22. A similar member 24 is disposed on the threaded end of the shaft, and is formed with a stem 25, angular in cross section, which is snugly fitted in the recess 20, of the drum 18. A nut 26 is engaged on the end of the shaft, outwardly of the member 24, whereby to hold the member on the shaft, while at the same time permitting free rotation of the member thereon. By this construction, the operator may grasp either of the members 22 or 24, and rotate the appropriate drum without interfering with, or causing the rotation of the other drum. Hinged to the front wall of the lower portion of the housing, at 27, and adapted to cover the upper half of one end portion of the sight opening 17, is a cover plate 28, and hinged to the said front wall, in line with the hinge of the cover plate 28, is a smaller cover plate 29, which, when in lowered position covers the word "Ice", printed on the said wall, just above the sight opening. The inner face of the cover plate 29 is painted red, or some color which will attract the attention, of the tradesman, so that he will know that the householder wishes some ice. On the peripheral face of the smaller drum 19 are formed the various amounts, or priced pieces of ice wanted. If the cover plate 29 is in lowered position, no ice is wanted, but when elevated, so that the colored side is in view, the tradesman knows that ice is wanted. When the cover plate 28 is in elevated position, two legends on the drum 18 will be displayed to view, but when such cover is lowered, only one legend, at a time is seen.

What is claimed is:

A device of the class described including a housing, a shaft in the housing, a pair of drums rotatably supported on the shaft, each of the drums having an angular recess in one end, and members rotatable on the shaft and supported by the housing, each of said members having an angular stem fitted in the recess of a drum whereby to rotate the drum independently of the shaft.

In testimony whereof, we affix our signatures.

THOMAS P. SHAW.
GEORGE W. RAKESTRAW.